Aug. 10, 1965  D. W. DAYTON  3,199,699
LOAD CARRYING MECHANISM FOR LIFT TRUCKS
Filed July 16, 1962  2 Sheets-Sheet 2

Donald W. Dayton
INVENTOR.

BY Eugene O. Farley
Atty.

United States Patent Office 3,199,699
Patented Aug. 10, 1965

3,199,699
LOAD CARRYING MECHANISM FOR LIFT TRUCKS
Donald W. Dayton, P.O. Box 6, Boring, Oreg.
Filed July 16, 1962, Ser. No. 210,163
3 Claims. (Cl. 214—654)

This invention relates generally to lift trucks of the type widely used in industrial work for elevating and carrying loads in warehouses, storage areas, and the like, and more particularly pertains to improvements in load carrying mechanisms which form a part thereof.

Although the present invention is particularly applicable for the handling of lumber and is designed for use on lift trucks, it may be used for handling articles other than lumber and may be applied to vehicles other than lift trucks.

It is a general objective of the present invention to provide an improved load carrying mechanism for lift trucks which is adapted to facilitate placement of a load in a loading area and particularly in loading areas of restricted dimension such as railroad box cars, and more specifically to provide a load carrying mechanism of the type described having power controlled means for moving such mechanism in a side shifting movement as well as a side pivotal movement to enable the operator to manipulate the load in such restricted areas, thus saving valuable space in loading and reducing operator and machine time, both in loading and unloading operations.

It is also an object of the present invention to provide load carrying mechanism for a lift truck which is compact in structure and which is adapted to handle loads such as lumber either in side or end loading engagement.

It is a further object of the present invention to provide load engaging mechanism for a lift truck which is adapted to handle loads such as lumber either in side or end loading engagement without attachment or detachment of structural elements peculiar to each method of load engagement.

Briefly stated, the present load carrying mechanism embodies a shift frame which is supported on elevating structure of the vehicle and which is movable in lateral directions in the elevating structure. Pivotally supported on the shift frame in forward projecting relation is a pivot frame, such frame being supported on vertical axis pivot means for lateral pivotal movement. The pivot frame carries load engaging forks on its forward end and also carries clamp means on the upper end thereof movable between a retracted position rearwardly of the forward end of the pivot frame and a load engaging position forwardly of such forward end. Power drive means are associated with each of the shift frame, pivot frame, and top clamp means to operate them in various positions of operation and load engagement. The elements of the load carrying mechanism are associated in an improved compact arrangement and an arrangement whereby to engage a load either in side loading or end loading without the attachment or detachment of any of the structural elements.

The manner in which the foregoing and other objects of the invention are accomplished will be apparent from the accompanying specification and claims considered together with the drawings, wherein:

Figure 1:
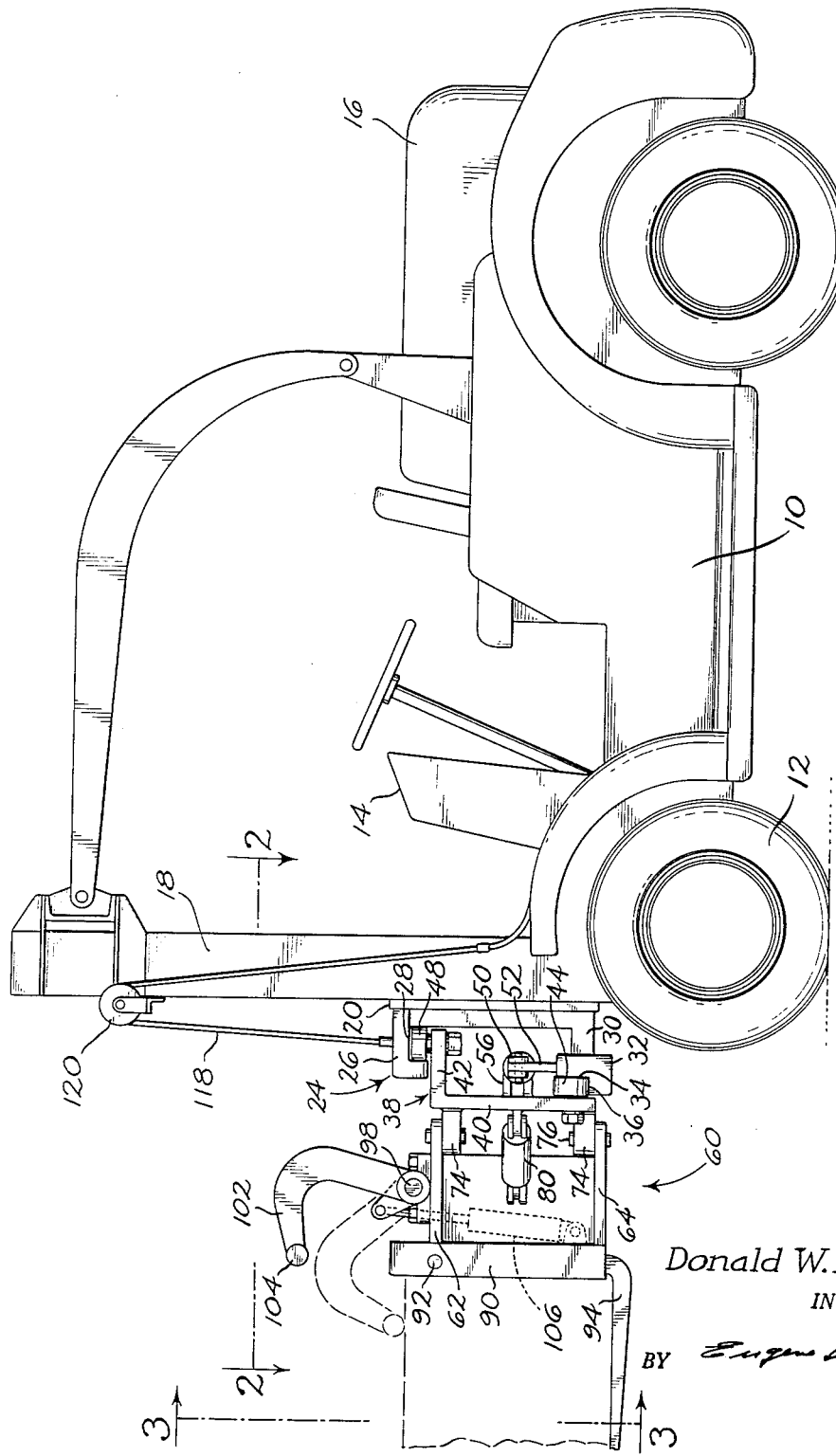
FIG. 1 is a side elevational view of the present load carrying mechanism as applied to a conventional type lift truck.

Referring first to FIG. 1 there is shown a conventional type lift truck to which the present load carrying mechanism may be applied. The lift truck shown, however, is only typical of various vehicles with which the instant mechanism may be used since it may be applied to other types and makes of such vehicles.

The lift truck exemplified in FIG. 1 comprises a frame 10 supported on front and back wheels 12 one set of which is steerable for maneuvering the truck. The frame 10 carries driver control means 14 and a power plant 16 which drives the truck and supplies power for load handling equipment thereon. Supported at the front of the frame 10 are a pair of fork lift uprights 18 forming elevating guides for a fork lift apron 20. Means for raising and lowering the apron 20 are associated with the uprights 18 but are not illustrated herein since such structure is conventional and does not constitute an essential part of the present invention.

In accordance with the principles of the present invention, a support member 24 forms an integral part of fork lift apron 20. This member has a forwardly projecting, laterally elongated portion 26 at the upper end thereof forming an inverted channel 28 which as will be seen hereinafter serves as track means for laterally movable mechanism. Projecting forwardly from the lower end of support member 24 is laterally elongated portion 30 having a right angular end enlargement 32. Enlargement 32 has a vertical track surface 34 and a horizontal track surface 36.

A shift frame 38 is adapted for lateral movement in the support member 24 and comprises an upright body member 40 and a top rearwardly directed flange 42 extending into the plane of channel 28.

A lateral shifting engagement is provided between the shift frame 38 and support member 24, and for this purpose the shift frame carries three sets of rollers 44, 46 and 48. Rollers 44, supported on a horizontal axis adjacent the lower end of upright body member 40 engage track surface 36 of bottom extension 30 and rollers 46, supported on a vertical axis also adjacent the lower end of body member 40, engage track surface 34. Rollers 48, supported on a vertical axis adjacent the end of flange 42 are confined in the inverted channel 28. Rollers 44 bear the downward weight of the mechanism and load and rollers 46 and 48 bear the pivotal forces thereof.

Such roller connection provides a readily shiftable movement of the shift frame in the support member 24. Such shifting movement is accomplished by power means preferably in the form of a double acting fluid cylinder 50 anchored at its rearward end to a bracket 52 forming an integral part of support member 24 adjacent one end thereof. The outer end of piston rod 54 of cylinder 50 is anchored to shift frame 38 by means of brackets 56 forming an integral part of such frame and disposed at the opposite side of the mechanism from that of brackets 52. Thus, by the application of fluid power to the double acting cylinder, through the medium of fluid connections 58, the shift frame 38 is adapted to be shifted laterally relative to the supporting member 24 and the vehicle.

Supported on the forward end of shift frame 38 is a pivot frame 60 having top and bottom frame plates 62 and 64, respectively. Frame plates 62 and 64 have forwardly angled rear edges 66, FIG. 2, leading from a central apex portion 68. Pivot frame 60 has intermediate frame members comprising upright and horizontal braces 70 and 72, respectively. The connection between shift frame 38 and pivot frame 60 is accomplished by upper and lower, forwardly extending lugs 74 forming an integral part of the shift frame and connected to the apex portion 68 of the upper and lower plates 62 and 64 of the pivot frame by vertical axis pivot pins 76 projecting through the lugs 74 and the plates 62, 64.

Due to the forwardly angled rear edges 66 of the plates 62, 64, the pivot frame is adapted to pivot relative to the shift frame, and also in view of the particular structure of the parts a close association of the shift and pivot frames is provided to form a compact relationship.

Figure 2:
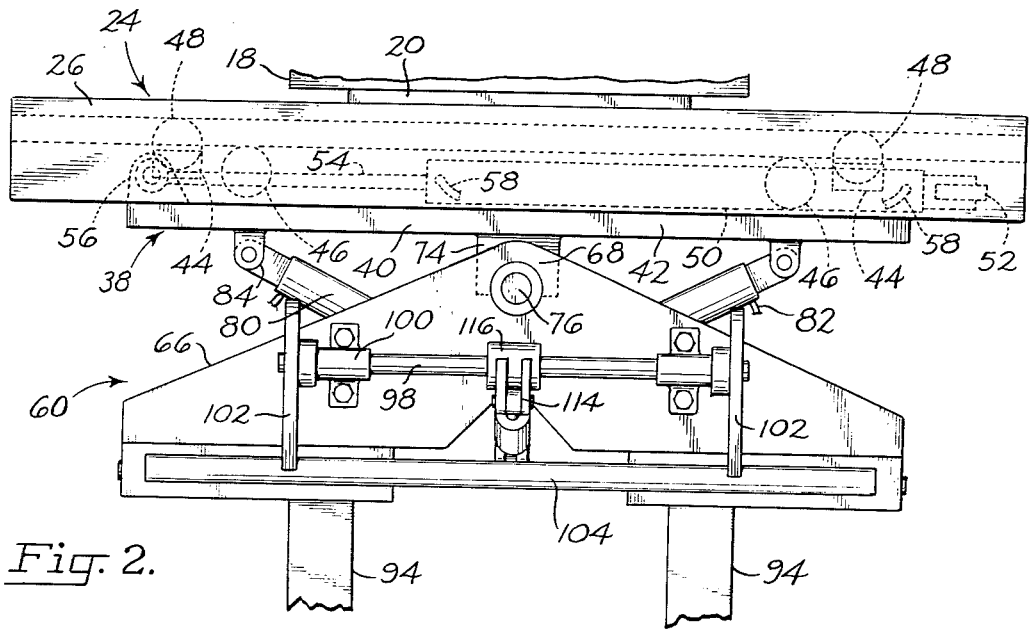
FIG. 2 is a fragmentary plan view of the present mechanism, taken on the line 2—2 of FIG. 1 and somewhat enlarged.
Figure 3:
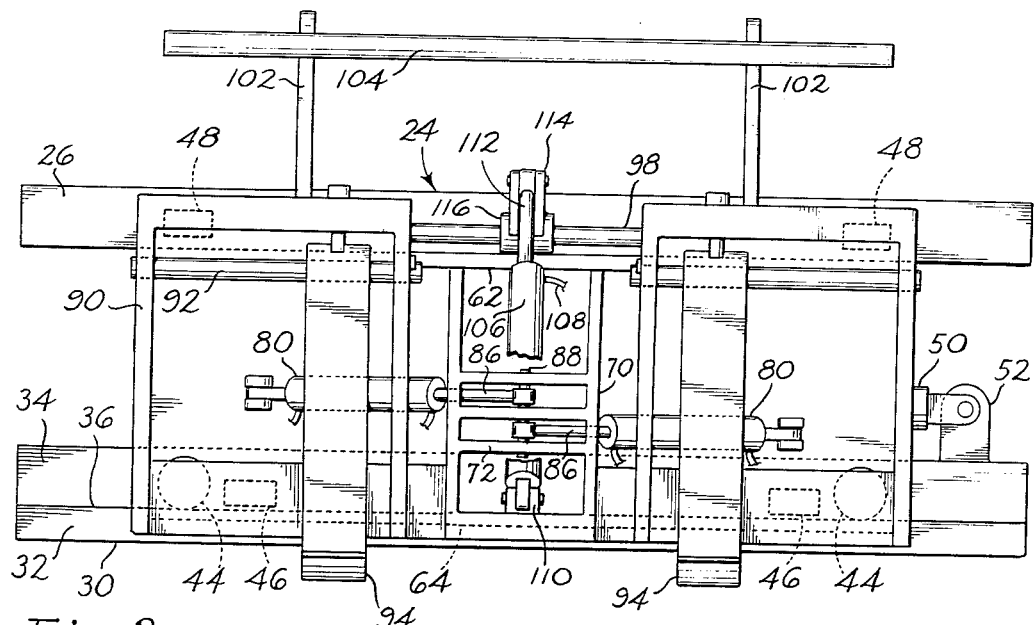
FIG. 3 is a front elevational view taken on the line 3—3 of FIG. 1 also somewhat enlarged.

Pivotal movement of the pivot frame is accomplished by power means preferably in the form of a pair of fluid cylinders 80 having fluid connections 82, FIG. 2. Cylinders 80 are pivotally anchored at their rearward ends to brackets 84 on the shift frame 38 and have piston rods 86 pivotally connected at their outer ends to an upright pin 88 mounted in horizontal brace members 72 of the pivot frame.

It is apparent that by the application of fluid power to the cylinders 80, pivotal adjusting movement of the pivot frame may be accomplished in the desired direction.

Secured integrally to the forward edge of the pivot frame 60 are fork supporting frames 90 rotatably carrying an upper transverse shaft 92 on which is mounted depending load engaging fork members 94 of the usual type. These fork members, in the conventional form, are pivotally mounted on the frame 90 through the intermediary of their shafts 92 and abut against the lower forward edge of their frame whereby to be pivoted outwardly and upwardly if necessary but maintained in a load engaging position by rearward abutment against such frames.

A load clamping mechanism is supported on the upper end of the pivot frame 60 and comprises a transverse shaft 98 journaled in a pair of spaced bearings 100. The shaft projects outwardly beyond the bearings and keyed to such projecting ends thereof is a pair of U-shaped arms 102. The outer or free ends of the arms are secured to a clamp rod 104 which in a retracted position thereof, as shown in full lines in FIG. 1, is disposed rearwardly of the front end of the pivot frame and in an extended or load engaging position, as shown in dotted lines, are disposed forwardly of the front end of the pivot frame. By means of the U-shaped characteristic of the arms 102 they are adapted to position the clamp rod 104 upwardly and out of the way of the loading area of the forks in said retracted position or, when desired, are adapted to position the rod 104 forwardly of the pivot frame as well as downwardly into the loading area of the forks in a load engaging position. It will be understood that the arms 102 may be of longer dimension than that shown but of similar configuration whereby to position the rod 104 closer to the forks than the arms illustrated in order to clamp thin loads thereon.

Rotation of the shaft 98 and therefore of the arms 102 as well is accomplished through the medium of power means preferably in the form of a double acting fluid cylinder 106 having fluid connections 108. The rearward end of cylinder 106 is pivotally anchored to a bracket 110 secured fixedly to a lower portion of the pivot frame. This cylinder projects upwardly and the outer end of its piston rod 112 is pivotally secured between a pair of lever arms 114 on a hub 116 keyed or otherwise secured nonrotatably to the shaft 98.

The various fluid cylinders 50, 80, and 106 are suitably connected to fluid pump and control means by their respective fluid connections, such pump and control means not being illustrated herein since such is of conventional and well known construction. The fluid connections are connected to flexible conduits 118 reeved over pulleys 120 at the upper end of the fork lift frame and associated with slack take-up mechanism, not shown, to maintain such conduits in an out-of-the-way operative position.

In accordance with the present invention a load carried on the forks 94 may be positioned selectively by the manipulation of the various lift, shift and pivot frames. More specifically, in positioning a load into a predetermined loading spot, or through restricted areas to arrive at such spot, the lift truck is manipulated in combination with manipulating motions of the elevating fork lift frame 20 and support member 24 thereon, the side shifting frame 38, and the pivot frame 60. It may be desirable to manipulate these various elements independently or if desired two or more of them may be manipulated simultaneously, depending upon the necessary positioning of the load. At any rate, the manipulative capability of the load carrying mechanism in combination with the manipulative capability of the truck facilitates placing a load in restricted areas or positioning multiple loads in compact relation.

A load may be carried laterally across the forks 94 in a side loading arrangement or may be carried longitudinally on the forks in an end loading arrangement. In either side or end loading, the clamp arm 104 may be utilized to clamp the load in the forks. In end loading, however, where the load is of substantial length the clamp rod 104 necessarily must bear on the load to clamp it on the forks.

The present mechanism is particularly applicable for handling stacks of lumber and particularly by end loading engagement therewith. By such end loading engagement and by necessary manipulation of the truck and the elevating and shift elements, it has been found that loading of a railroad car can be accomplished from one side wherein only a single side loading platform is required.

The above operational features, in addition to being accomplished by the manipulating movements of the various parts, result from the compact arrangement of the parts and the absence of any structure which may interfere with the manipulation of the truck or the load carrying mechanism. That is, the lateral dimension has been maintained at a minimum and the load clamp mechanism comprising the arms 102 and rod 104 is mounted in an out of the way position on top of the pivot frame.

The load carrying mechanism is readily convertible from a side loading engagement of the load wherein it may be desirable not to use the clamp rod to an end loading engagement using such clamp rod without the necessity of attaching or detaching any parts, it only being necessary to rotate the clamp rod to the position desired.

It is to be understood that the invention may take other forms than that shown and that all such modifications and variations within the scope of the appended claims which will occur to persons skilled in the art are included in the invention.

Having thus described my invention, I claim:

1. A load carrying mechanism for a lift truck comprising a support member adapted for mounting on a lift truck for vertical movement, upper and lower laterally disposed track means on the support member, a laterally elongated shift frame, roller means on the shift frame engaging the track means and supporting the shift frame for lateral movement on the support member, power means interconnecting the support member and shift frame for providing said lateral movement, a pivot frame, vertical axis pivot means supported in fixed position on the shift frame and mounting the pivot frame on the shift frame for lateral pivotal movement, power means interconnecting the shift frame and the pivot frame for providing said pivotal movement, load engaging members on the pivot frame, a load clamp member, laterally disposed pivot means on the upper end of the pivot frame mounting the clamp member on the pivot frame for movement of the clamp member between a retracted raised position and a load engaging forward position, and power means interengaging the pivot frame and clamp member for rotating the load clamp member about the axis of the pivot means between said retracted raised position and said load engaging forward position.

2. A load carrying mechanism for a lift truck, comprising a support member adapted for mounting on a lift truck for vertical movement, a laterally elongated shift frame mounted on the support member for lateral movement relative thereto, power means interconnecting the support member and shift frame for providing said lateral movement, pivot support means on the shift frame projecting forwardly from the center thereof, a pivot frame having rearward edges converging rearwardly substantially to a central apex, vertical axis pivot means interconnecting the pivot support means and the pivot frame at said central apex and mounting the pivot frame on the shift frame for lateral pivotal movement, power means interconnecting the shift frame and the pivot frame for providing said pivotal movement, load engaging members on the pivot frame, a load clamp member, laterally disposed pivot means on the upper end of the pivot frame mounting the clamp member on the pivot frame for movement of the clamp member between a retracted raised position and a load engaging forward position, and power means interengaging the pivot frame and clamp member for rotating the load clamp member about the axis of the pivot means between said retracted raised position and said load engaging forward position.

3. A load carrying mechanism for a lift truck, comprising a support member adapted for mounting on a lift truck for vertical movement, a laterally elongated shift frame mounted on the support member for lateral movement relative thereto, means interconnecting the support member and shift frame for providing said lateral movement, pivot support means on the shift frame projecting forwardly from the center thereof, a pivot frame, vertical axis pivot means interconnecting the pivot support means and the pivot frame and mounting the pivot frame on the shift frame for lateral pivotal movement, means interconnecting the shift frame and the pivot frame for providing said pivotal movement, load engaging members on the pivot frame, a load engaging means, laterally disposed pivot means on the upper end of the pivot frame mounting the engaging means on the pivot frame for movement of the said means between first and second positions, and means interengaging the pivot frame and load engaging means for rotating the load engaging means about the axis of the pivot means between said first and second positions.

References Cited by the Examiner
UNITED STATES PATENTS

| | | | |
|---|---|---|---|
| 1,846,413 | 2/32 | Abbe | 214—654 |
| 2,621,821 | 12/52 | Melin | 214—730 |
| 2,621,822 | 12/52 | Melin | 214—730 |
| 2,806,619 | 9/57 | Schroeder | 214—730 |
| 2,851,182 | 9/58 | Gehring | 214—730 |
| 2,950,831 | 8/60 | Anzons | 214—731 |

HUGO O. SCHULZ, *Primary Examiner.*

MORRIS TEMIN, *Examiner.*